Patented May 15, 1934

1,958,711

UNITED STATES PATENT OFFICE 1,958,711

PROTECTIVE OVERCOATING

Thomas F. Murray, Jr., Rochester, N. Y., assignor to Eastman Kodak Company, Rochester, N. Y., a corporation of New York No Drawing. Application May 29, 1930, Serial No. 457,511

12 Claims. (Cl. 91—68)

This invention relates to a new type of protective coating, and particularly to such coatings as are used as the final or overcoating for the protection of undercoatings from the short rays of light.

The lacquer industries and especially those using the lacquers containing cellulose derivatives, have increased tremendously in the past few years due primarily to the ease with which this lacquer may be coated upon metallic or other surfaces, and likewise to the rapidity with which these lacquers dry. In the automotive industry particularly, its use has released considerable of the materials which formerly were held in process and have, therefore, decreased greatly the expense incident to their coating and finishing. From the consumer's standpoint, however, cellulose nitrate lacquers have not appreciably increased the period of time during which his automobile is kept from corrosion and in which his car retains its initial glossy and new appearance, it being a well known fact that cellulose nitrate loses its gloss with relatively great rapidity when exposed to the elements. The delustering and decomposition of the cellulose nitrate surface, while to some extent due to inclement weather conditions, is nevertheless primarily due to the ultra-violet rays from the sun which penetrate and decompose the surface layer of the lacquer.

While the addition of pigments, gums, and plasticizers to the cellulose nitrate composition aids to a slight extent in rendering the cellulose nitrate layer less affected by the ultra-violet light, the protection they afford is not by any means complete. With even a considerable amount of these constituents in the lacquer there is, nevertheless, upon the surface, a goodly proportion of cellulose nitrate directly exposed to the solar radiation. Moreover, it has been found that the exposed cellulose nitrate under such conditions will be decomposed by the ultra-violet light incident to its surface. Furthermore, decomposition of the exposed cellulose nitrate will auto-catalyze the underlying cellulose nitrate particles which are in intimate contact therewith. This auto-catalysis of the cellulose nitrate creeps through the whole surface with ever-increasing velocity with resultant decomposition which removes most of the original luster of the surface. To obviate these difficulties it has been suggested that a high gloss varnish or other transparent material be overcoated on the cellulose nitrate or other coating to inhibit its breakdown.

While it has been previously suggested in the application of Paul C. Seel, Serial #425,353, to overcoat nitrate lacquers with a clear lacquer containing cellulose acetate, we find that the protective effect of such an acetate lacquer coating may be materially improved, particularly from the standpoint of light protection, by preparing it in accordance with my invention.

An object of the present invention is to provide a filter for the absorption of short light rays, another object is to provide a cellulose acetate surface or overcoating which absorbs substantially all the ultra-violet light which has a deleterious effect upon the undercoating. Another object is to provide a cellulose acetate lacquer which, having been applied in the usual manner, absorbs many of the decomposing light rays. Other objects will hereinafter appear.

I have found that coating compositions which contain a small percentage of diphenylguanidine or the ortho, meta, or para diphenyl benzenes have the unusual property of inhibiting the passage of ultra-violet light therethrough. Coating compositions containing these materials are, therefore, very useful for overcoating finished surfaces since the presence of diphenylguanidine or diphenyl-benzene in the overcoating protects from the ultra-violet light which is, thereby, prevented from reaching and decomposing the undercoating.

I have found this to be particularly true in compositions such, for example, as the cellulose derivative lacquers. Usually surfaces are coated with a number of coatings of cellulose nitrate which may or may not contain a pigment. By overcoating such a surface with a cellulose acetate lacquer, containing diphenylguanidine or a diphenylbenzene or their derivatives or equivalents, an undercoating of cellulose nitrate, for example, which deteriorates rapidly in the presence of ultra-violet light will be protected therefrom.

The amounts of these ingredients required to be present in cellulose acetate or other overcoatings in order to render the coatings opaque to the ultra-violet, vary generally with the types of the light filter employed. If added in amounts up to about 3% the filtering action will be substantially the maximum for any of these compounds. Upon the addition of these light filters to the vehicle, such as cellulose acetate, in amounts sufficient to give the maximum opacity to ultra-violet light a greater addition of the filter does not proportionately increase the opaqueness of the film to the ultra-violet rays. Even though diphenyl benzene or diphenyl guanidine be added to a cellulose acetate composition, for example, in amounts up to say 5 to 10 percent, the plasticity of the cellulose acetate is not generally as high as desirable and it is, therefore, advisable to add a plasticizer to the composition if a higher degree of plasticity is desired. Any of the well known plasticizers for cellulose acetate may, of course, be employed, such, for instance, as triphenyl phosphate, tricresyl phosphate, the chlorinated naphthalenes, etc. If desired, the amount of diphenyl guanidine or diphenyl benzene may be raised sufficiently to impart plasticity to the film, but I have generally preferred to add to the cellulose acetate composition, to which has been added only filter quantities of the diphenyl benzene or diphenyl guanidine, another plasticizer to impart thereto this quality. Also it should be noted that, while the meta or ortho diphenyl benzenes are soluble to 10% or more, the para diphenyl benzene is not soluble in the usual cellulose acetate solvents except in amounts from .2 to .5 of one per cent unless a plasticizer such as triphenyl phosphate or others be added for retaining the para compound in solution, whereupon as much as 2% or more of the para diphenyl benzene may be retained in the composition without crystallizing out.

I have found that it is not material what type of vehicle holds the filter as suitable varnishes, gums, shellacs, etc., for some purposes, are equally as useful as incorporating the filter in a cellulose derivative composition. It is desirable, of course, that this vehicle per se be not materially disintegrated by the ultra-violet light. Nor should we be understood to restrict ourselves to cellulose acetate particularly as an overcoating, cellulose derivative vehicle. There are numerous other such esters of cellulose, the mixed organic esters, as cellulose aceto-propionate, cellulose aceto-benzcate, etc., the mixed inorganic-organic esters of cellulose similar to cellulose nitro-acetate, cellulose phospho acetate, etc., or, for that matter, the other aliphatic organic esters of cellulose such as cellulose propionate, cellulose butyrate, etc., which for some purposes are equally as suitable.

As an example of the method of employing my novel light filters it may be stated that with a quantity of cellulose acetate, for instance, may be mixed from 3 to 10% of either diphenyl benzene or diphenyl guanidine and from 30 to 50% of a plasticizer such as triphenyl or tricresyl phosphate, chlorinated naphthalene or the like, this percentage being based on the weight of the cellulose acetate employed. This mixture may then be dissolved in a suitable quantity of a solvent mixture such as one comprising approximately 15% ethyl acetate, 50% acetone, 20% ethyl lactate and 15% denatured alcohol, approximately one gallon of this solvent mixture being required for each 20 ounces of cellulose acetate employed. Obviously, other plasticizers and other solvents or solvent mixtures known to those skilled in the art may be employed. While I have referred herein to the use of as low as 2 or 3% of the filter, it may be desirable, as noted above, to employ as high as approximately 10% of the filter in order that there be no question but what substantially all of the deleterious ultra-violet light is filtered out. All of these variations will be apparent to those skilled in the art and are to be included herein.

What I claim as my invention and desire to be secured by Letters Patent of the United States is:

1. A new composition of matter comprising cellulose acetate and from ¼ to 10 per cent of a compound selected from the group consisting of diphenyl benzene and diphenyl guanidine.

2. A new composition of matter comprising a cellulose derivative, ¼ to 10 per cent of a compound selected from the group consisting of diphenyl benzene and diphenyl guanidine and 20 to 50 per cent of a plasticizer.

3. A new composition of a matter comprising a cellulose derivative and diphenyl benzene.

4. A new composition of a matter comprising cellulose acetate and diphenyl benzene.

5. A new composition of matter comprising a cellulose derivative and diphenyl guanidine.

6. A new composition of matter comprising cellulose acetate and from ¼ to 10 per cent of diphenyl guandine.

7. A composition of matter comprising cellulose acetate and diphenyl guanidine.

8. A new composition of matter comprising cellulose acetate and from ¼ to 10 per cent of diphenyl benzene.

9. An article of manufacture having a closely adhering cellulose nitrate coating with an overcoating of an organic derivative of cellulose containing a light-filtering compound selected from the group consisting of diphenyl benzene and diphenyl guanidine, the overcoating being substantially transparent to visible light and having the characteristic, due to its content of the light filter, that it is absorbent of substantially all the wave lengths of the ultra-violet that penetrate the terrestrial atmosphere.

10. An article of manufacture having a closely adhering cellulose nitrate coating with an overcoating of cellulose acetate containing a light-filtering compound selected from the group consisting of diphenyl benzene and diphenyl guanidine, the overcoating being substantially transpartnt to visible light and having the characteristic, due to its content of the light filter, that it is absorbent of substantially all the wave lengths of the ultra-violet that penetrate the terrestrial atmosphere.

11. An article of manufacture having a closely adhering cellulose nitrate coating with an overcoating of cellulose acetate containing diphenyl benzene, the overcoating being substantially transparent to visible light and having the characteristic, due to its content of the diphenyl benzene, that it is absorbent of substantially all the wave lengths of the ultra-violet that penetrate the terrestrial atmosphere.

12. An article of manufacture having a closely adhering cellulose nitrate coating with an overcoating of cellulose acetate containing diphenyl guanidine, the overcoating being substantially transparent to visible light and having the characteristic, due to its content of the diphenyl guanidine, that it is absorbent of substantially all the wave lengths of the ultra-violet that penetrate the terrestrial atmosphere.

THOMAS F. MURRAY, Jr.